F. SCHTABE.
LEVEL ATTACHMENT FOR DRILLS.
APPLICATION FILED AUG. 10, 1909.
960,718.
Patented June 7, 1910.
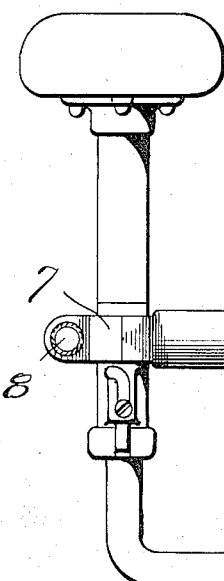
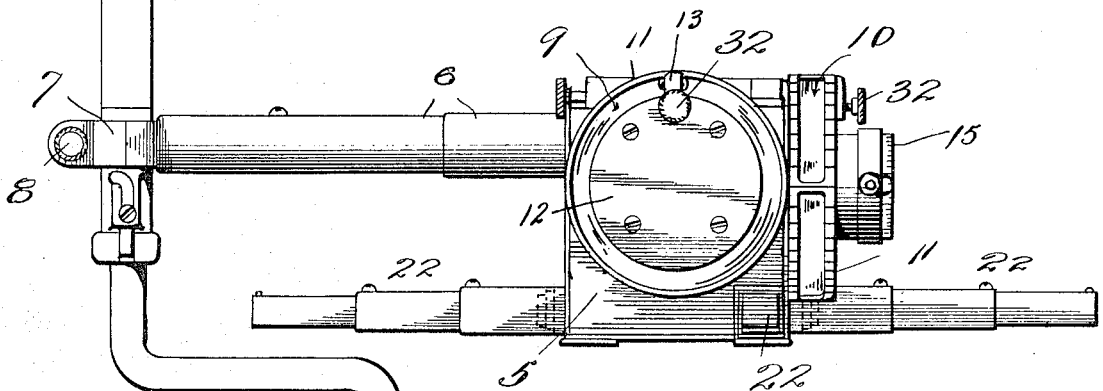
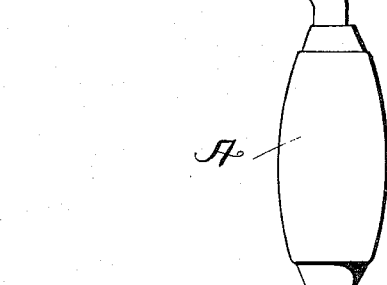
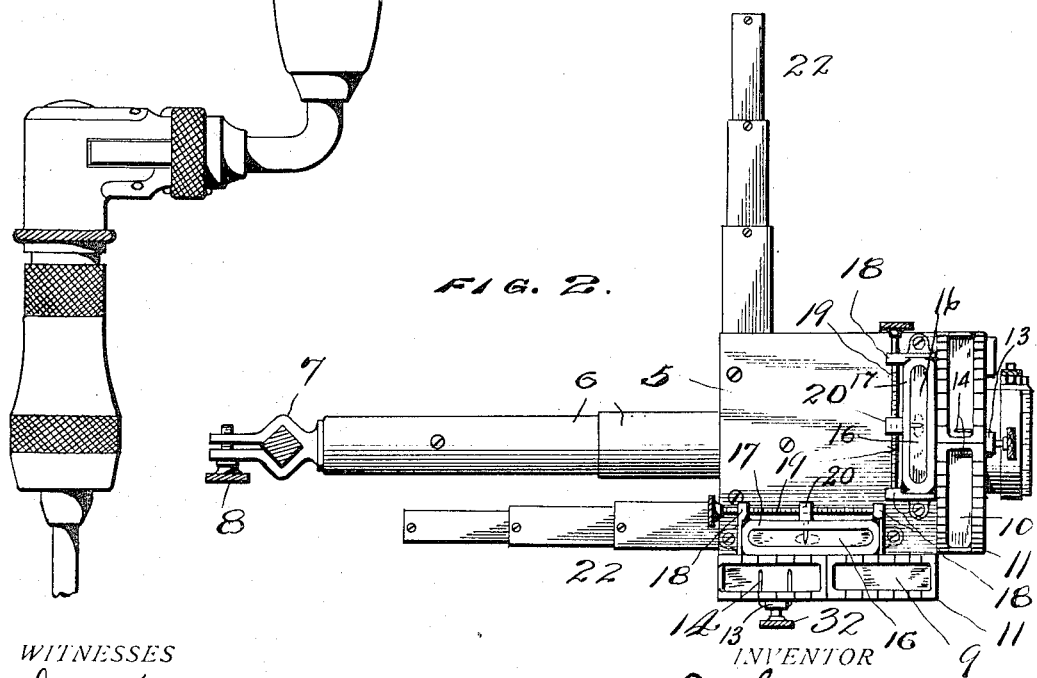

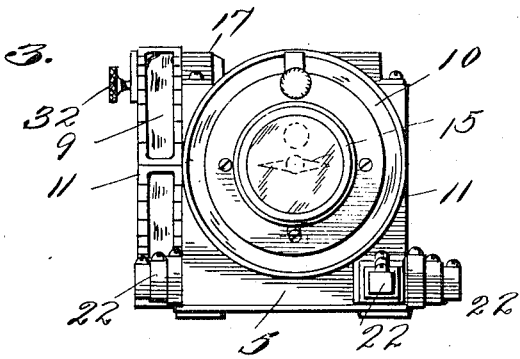
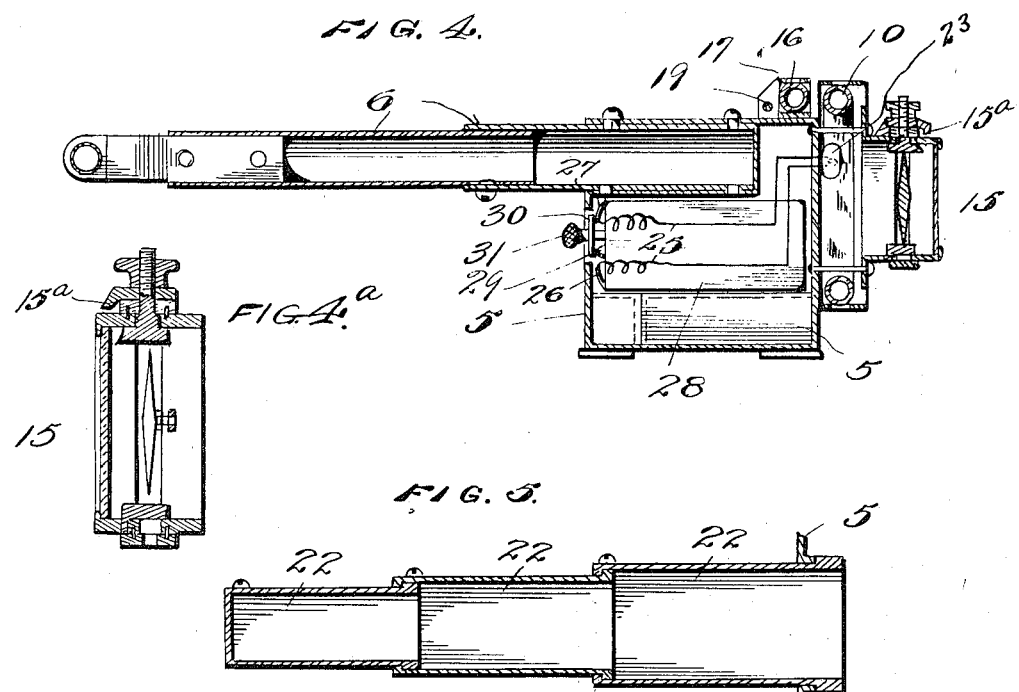
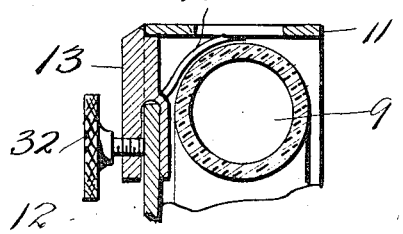
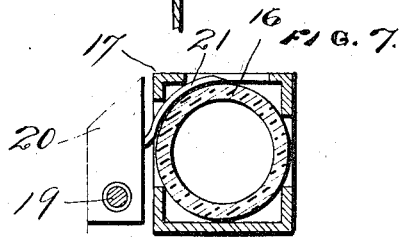

UNITED STATES PATENT OFFICE.

FERDINAND SCHTABE, OF NEW YORK, N. Y.

LEVEL ATTACHMENT FOR DRILLS.

960,718.          Specification of Letters Patent.     Patented June 7, 1910.

Application filed August 10, 1909. Serial No. 512,229.

*To all whom it may concern:*

Be it known that I, FERDINAND SCHTABE, citizen of the United States, residing at New York, in the county of New York and State of New York, have invented certain new and useful Improvements in Level Attachments for Drills, of which the following is a specification.

My invention relates to apparatus for finding and maintaining a desired angle at which a hole is to be bored, the means for maintaining the angle being attachable to a boring brace, and embodying elements having an arbitrary scale corresponding to a similar scale of the angle finder.

In the accompanying drawings, illustrating my invention, and forming a part of this specification, Figure 1 is an elevation of a boring brace provided with my improved level attachment. Fig. 2 is a top plan view of my improved level attachment removed. Fig. 3 is an end elevation thereof. Fig. 4 is a vertical longitudinal sectional view taken therethrough. Fig. 4ª is an enlarged view of the compass 15, shown in Fig. 4. Fig. 5 is a longitudinal sectional view taken through one of the folded casing supports, removed, and in a distended position, and on an enlarged scale. Fig. 6 is a transverse sectional view taken through one of the side circular levels, and on an enlarged scale, and Fig. 7 is a similar view taken through one of the upper straight levels.

In the preferred embodiment of my invention as illustrated in the drawings, 5 designates a rectangular casing to which is connected a plurality of tubes 6, which are arranged to telescope within one another. The outer tube 6 is provided with a suitable clasp 7, operated by an adjusting screw 8, to attach said clasp and the casing 5 to a boring brace A. Thus the casing 5 may be moved toward and away from the said brace A within the limits of the adjustment of the connecting tubes 6. The casing 5 is provided as shown, upon two of its sides, with circular spirit levels 9 and 10, mounted within circular frames 11, arbitrarily graduated. Said spirit levels 9 and 10 are held within said frames 11 by circular plates 12 Fig. 6 of reduced diameter to the diameter of the frames 11, and provided with movable indicators 13 for said spirit levels, having bifurcated ends slidably arranged upon the peripheral edge of the said plates 12, and their opposite ends slidably supported upon the edge of frames 11, and provided with indicating fingers 14, extending inwardly between said plates 12 and said frames 11 and resting upon the levels 9 and 10. The level 10 is further provided with an angle indicating-compass 15, secured centrally upon its circular plates 12, which may have a movable indicator 15ª, and which is adapted to be used in connection with angles, which cannot be indicated by the spirit levels. As intimated, the spirit levels 9 and 10 and the compass 15 are employed to maintain the desired angle, indicating fingers being moved to the desired point.

Mounted upon the upper surface of the casing 5, are a pair of straight levels 16, arranged at right-angles to one another in frames 17, provided with inwardly extending apertured brackets 18 at the ends thereof, through which screw shafts 19 are longitudinally immovably journaled. Mounted upon the screw shafts 19 Figs. 2 and 7 are movable indicators 20 arranged between the brackets 18, which indicators are threaded to correspond with the pitch of the threaded shafts 19, to be moved longitudinally thereon by the rotation of said shafts, and provided with indicating fingers 21, extending inwardly upon the straight levels 16. It will be apparent that the indication of the levels 16 will change in accordance with the angular movement of the brace A, and the indication of the circular levels 9 and 10 and the compass 15, and that in accordance therewith, the movable indicators 20 thereof may be readily moved to the desired point in order that the operator of the boring brace A may more readily maintain said brace at the proper angle by keeping his eyes upon the straight levels 16.

Mounted within the base of the casing 5, and arranged to extend outwardly from the corners thereof at right angles to one another, are a plurality of supporting arms comprising telescopingly adjustable sections 22, which may be telescoped inwardly toward casing 5, as shown in Fig. 3, or distended to the position shown in Figs. 1, 2 and 5 to abut any suitable support which may be handy, in order to assist the operator in maintaining the brace A at the desired angle. Inasmuch as work of this character is very often required to be done in relatively dark places, I provide the casing 5 with a lighting attachment comprising a bulb 23 Fig. 4, which is mounted through the wall of the casing 5, and has battery wires 25 connected respectively to one pole 26, and an insulated contact member 27 of a dry battery 28 of the ordinary type mounted within said casing 5. The opposite pole 29 of the battery 28 is arranged to be connected with the insulated contact member 27 by a rotatable switch plate 30, having its shank journaled through one wall of the casing 5, and provided with an exterior operating knob 31.

Referring back to the movable indicators 13 and 20, of the circular and straight levels 9 and 10, and 16 respectively, it will be apparent that the said movable indicators 20 will not move except upon rotation of the screw shafts 19, while the movable indicators 13 may be immovably locked in engagement with the circular plates 12 by means of a screw stop 32, threadedly mounted through said indicators 13 and adapted to be screwed into tight engagement with the said plates 12.

Having fully described my invention, I claim:

1. In a device of the character described, the combination with a boring brace, of a level casing, adjustable means for supporting the same from said brace, angle indicating means carried by said casing, and adjustable supporting arms carried by said casing, substantially as described.

2. In a device of the character described, the combination with a boring brace, of a level casing, means for supporting said casing from the brace, said means being adjustable to allow of the movement of said casing toward and away from said brace, angle indicating means carried by said casing, and longitudinal telescoping supporting arms carried by said casing for adjustment toward and away from the same, substantially as described.

3. In a device of the character described, the combination with a boring brace, of a level casing, adjustable means for supporting the same from said brace, levels arranged upon said level casing and at right angles to each other, adjustable indicators arranged upon said level casing for coöperating with said levels, and adjustable supporting arms carried by said casing, substantially as described.

In testimony whereof I affix my signature in presence of two witnesses.

FREDINAND SCHTABE.

Witnesses:
ARTHUR T. FOWLER,
GEO. H. HENKEN.